United States Patent [19]
Kettler

[11] 3,991,792
[45] Nov. 16, 1976

[54] ANTI-SIPHON GASOLINE TANK

[76] Inventor: William C. Kettler, 1049 W. Cass Ave., Flint, Mich. 48505

[22] Filed: Feb. 3, 1975

[21] Appl. No.: 546,258

[52] U.S. Cl. .............................. 138/108; 138/44; 138/103
[51] Int. Cl.² ...................................... F16L 55/00
[58] Field of Search .............. 138/108, 103, 44, 40, 138/41, 89, 39, 37; 137/140, 141, 143, 150.5, 123, 152, 151, 590, 48; 29/227–229; 285/225, 382, 382.7; 72/48, 292, 370

[56] References Cited
UNITED STATES PATENTS

| | | | |
|---|---|---|---|
| 173,962 | 2/1876 | Johnson | 285/382 |
| 435,844 | 9/1890 | Logan | 29/228 |
| 1,079,985 | 12/1913 | Kaminsky | 138/43 X |
| 1,873,590 | 8/1932 | James | 285/225 |
| 3,390,698 | 7/1968 | Carmichael et al. | 137/590 X |

Primary Examiner—Richard E. Aegerter
Assistant Examiner—Larry Jones
Attorney, Agent, or Firm—Basile, Weintraub and Vanophem

[57] ABSTRACT

A gasoline or other fuel storage tank associated with a fuel-powered vehicle has a recoiled spring disposed therewithin to prevent the siphoning of the fuel therefrom.

4 Claims, 5 Drawing Figures

ANTI-SIPHON GASOLINE TANK

BACKGROUND OF THE INVENTION

1. Field of the Invention

The present invention relates to fuel powered vehicles and the fuel tanks thereof. More particularly, the present invention relates to fuel tanks of fuel powered vehicles having anti-theft means associated therewith.

2. Priot Art

Because of ever increasing fuel shortages and increases in the prices thereof, there has been an ever growing amount of fuel related thefts. One of the most common types of fuel thefts is the siphoning of fuel from vehicles. Because of the simplicity with which siphoning is achieved, no vehicle fuel tank is safe from such criminality.

The problem of siphoning of fuel from vehicles, however, has long been recognized in the prior art. Thus, the prior art has taught the use of locking means associated with fuel tank caps. See, inter alia, U.S. Pat. Nos. 1,895,963 and 1,687,814. However, such locking means are subject to mechanical malfunction, lost keys, jimmying and the like. Moreover, they render the filling of their associated fuel tanks quite inconvenient.

Therefore, there would be provided a major advance in the art if a fuel tank could be rendered syphon-proof while obviating the cumbersomeness of prior art anti-theft devices. It is to this with which the present invention is concerned.

SUMMARY OF THE INVENTION

In accordance with the present invention there is provided an anti-siphon fuel tank for vehicles. The present invention generally comprises a unitary or integrally formed storage tank and neck. The invention further includes means fixedly disposed within the neck which prevents the introduction of siphoning means into the tank.

The present invention is adaptable to already existing fuel tanks and is equally applicable to new fuel tank manufacture.

For a more complete understanding of the present invention, reference is made to the following detailed description and accompanying drawing. In the drawing, like reference characters refer to like parts throughout the several views in which:

DESCRIPTION OF THE PREFERRED EMBODIMENTS

Figure 1:
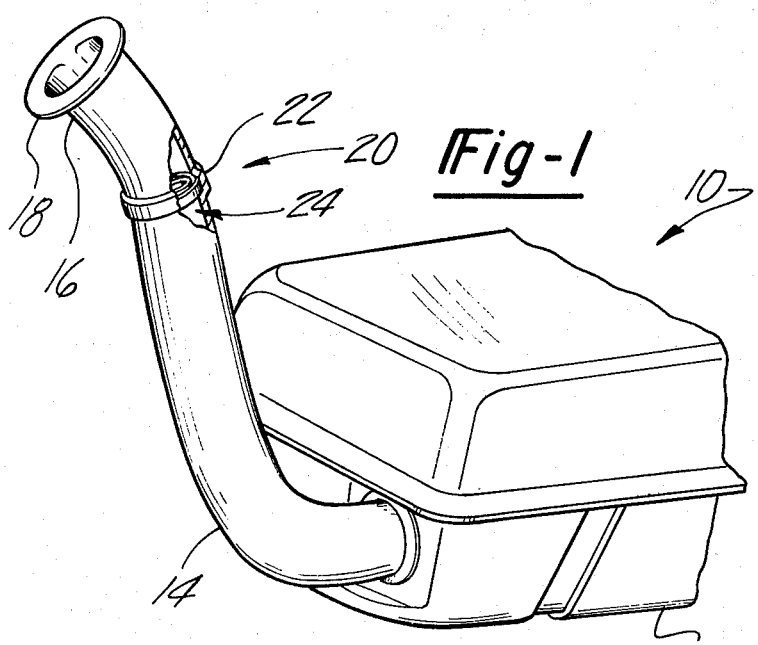
FIG. 1 is a perspective view, partly in section, depicting a first embodiment of the present invention.
Figure 2:
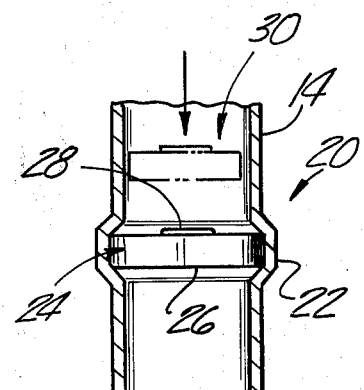
FIG. 2 is a broken, cross-sectional view, partially in phantom of the first embodiment of the present invention.
Figure 3:
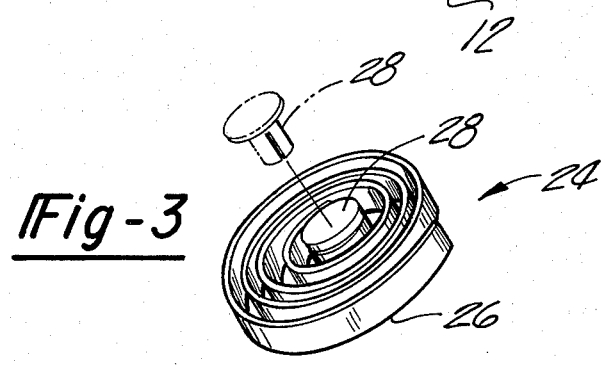
FIG. 3 is an exploded perspective view of the biassing means employed in the practice of the present invention.

Now with reference to the drawing, and in particular FIGS. 1-3, there is depicted a first embodiment of the present invention. According to the first embodiment there is provided a fuel tank for a vehicle, generally indicated at 10. The fuel tank 10 comprises a fuel storage compartment 12 and an open neck 14 integrally formed therewith in a conventional manner. The rim 16 of the neck 14 has a lip 18 which receives a tank cap (not shown), also, in the conventional manner well known to the skilled artisan.

As shown in FIGS. 1 and 2 at a medial point along the neck 14 of the tank 10 an internal expansion 20 is provided. The expansion 20 defines an annular seat 22 for a means for preventing siphoning, generally indicated at 24.

The means 24 comprises a recoil expansion spring or biassing means 26 and a centrally mounted stop or button 28 to which the inner end of the spring is permanently fixed. The button 28 prevents the positioning of a hose or other siphoning means on the center of the neck 14.

In practicing the present invention, the neck of the tank is first internally expanded with any suitable tool. A completly coiled spring is then inserted into the neck of the tank. Next, the coiled spring is allowed to expand within the neck. This is diagrammatically shown in FIG. 2, as at 30. The expansion of the spring causes a frictional engagement between the outer coil and the wall of the neck. The coil is then pushed, via any suitable means or mode, down the neck until it is placed within the annular seat 22. The annular seat, having a greater circumference than the neck, becomes a permanent seat for the spring since the spring expands to meet the wall of the seat.

Figure 5:
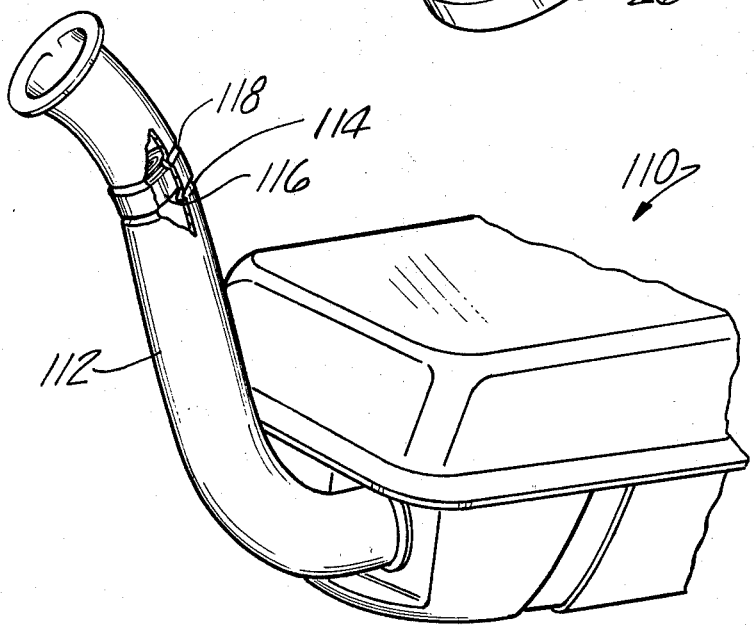
FIG. 5 is a cross-sectional perspective view similar to FIG. 2, but depicting the alternate embodiment of the present invention.
Figure 4:
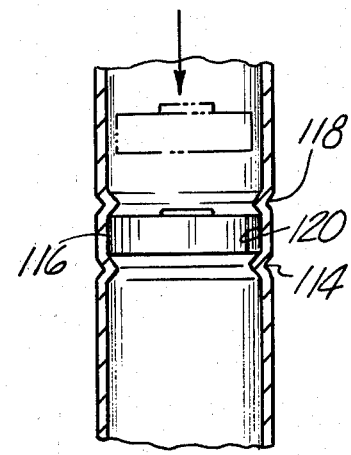
FIG. 4 is a perspective view similar to FIG. 1, but depicting an alternate embodiment of the present invention.

In FIGS. 4 and 5 there is depicted a modified form of the invention. In this embodiment the neck 112 of the tank 110 is crimped or otherwise provided with a first reduced diameter section 114. The section 114 defines a shoulder upon which the biassing means 116, such as that described with reference to the embodiment of FIGS. 1-3, is seated.

The neck 112 is, also, provided with a second crimped or reduced diameter section 118. This second section is located immediately above the biassing means 116. Thus, the space 120 defined between the two reduced diameter sections defines a permanent seating for the biassing means. Crimping can be achieved through any suitable means such as hydraulic or pneumatic compression rings or the like, in a manner well known.

In practicing this embodiment of the invention, the section 114 is formed in the neck 112. Thereafter, the biassing means 116 is inserted in the neck in the manner heretofore described. The biassing means is then pushed down the neck of the tank until it abuts the upper edge of the section 114. Finally, the portion of the neck immediately above the upper portion of the biassing means is crimped to define the section 118.

In a practical embodiment of the present invention there is provided a conventional automobile fuel tank having a two inch diameter neck formed therewith. A heavy gage three-sixteenth inch width coil spring is wound to a diameter of about one and one-half inches and inserted into the neck. The spring is released within the neck and is then pushed down the neck about five to six inches until it engages the annular expansion seat or abuts the crimped reduced section. The annular expansion seat has a width of about one-fourth inch to conveniently accommodate the spring which will be, thusly, expanded to about a two and one-half inch diameter. It should be noted that the point at which the seat for the biassing means is formed is such that it lies below the point at which the nozzle of a fuel pump lies. Thus, the five or six inch spacing is not limitative, but only illustrative.

In both embodiments, the height of the seating area is about one-fourth inch.

In selecting the proper coiled spring for use herein, the spacing between the coils upon expansion is the major determinative. A spacing of about one-eighth inch between coils is preferred since conventional tubing generally has about a one-fourth inch minimum outside diameter. Lesser diameters render siphoning impractical. Moreover, this spacing of one-eighth inch does not in any manner inhibit fuel flow into the tank.

It should be noted with respect hereto that the present invention is adaptable for use in conjunction with all fuel tanks having a neck extending from a fuel storage compartment. Thus, the invention is efficaciously employed in trucks, automobiles, snowmobiles, motorcycles and like liquid fuel powered vehicles.

It is apparent from the preceding that there has been described an anti-siphon fuel tank that can be easily adapted to existing fuel tanks as well as to new manufacture.

Having thus described the invention, what is claimed is:

1. In combination with a fuel tank of the type having an open elongated neck communicating with a fuel storage compartment, means for preventing the siphoning of fuel from the fuel tank, comprising:
   a. an annular seat formed in the neck,
   b. a coiled spring disposed in the seat of the neck of the fuel tank,
   wherein the annular seat has a width slightly larger than the width of the coiled spring to prevent the removal of the spring from the seat.

2. The combination of claim 1 wherein the seat comprises an internal annular expansion having circumference greater than that of the neck.

3. The combination of claim 1 wherein the neck has a first and a second reduced diameter section, the seat being defined by the space between the sections.

4. The combination of claim 1 wherein the spring has a central button fixedly secured thereto.

* * * * *